US006770821B2

(12) United States Patent
Higgs

(10) Patent No.: US 6,770,821 B2
(45) Date of Patent: Aug. 3, 2004

(54) STRAIN CONTROL DEVICE FOR ATTACHING TRANSMISSION LINES TO DEFORMABLE STRUCTURES AND METHODS EMPLOYING SAME

(75) Inventor: Thomas W. Higgs, Kaysville, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 10/056,943

(22) Filed: Oct. 25, 2001

(65) Prior Publication Data

US 2003/0079905 A1 May 1, 2003

(51) Int. Cl.[7] ................................................ H02G 3/04
(52) U.S. Cl. ........................... 174/135; 174/97; 174/98
(58) Field of Search ............................ 174/72 A, 72 C, 174/73.1, 96, 97, 98, 135; 385/100, 135, 134, 136

(56) References Cited

U.S. PATENT DOCUMENTS

| | | | | |
|---|---|---|---|---|
| 3,391,432 A | * | 7/1968 | Du Rocher | ................ 174/72 A |
| 4,023,879 A | | 5/1977 | Braund et al. | |
| 4,567,318 A | * | 1/1986 | Shu | ........................ 174/35 GC |
| 4,723,053 A | | 2/1988 | Amaya | |
| 4,845,316 A | | 7/1989 | Kaercher | |
| 4,911,510 A | * | 3/1990 | Jenkins | ......................... 174/86 |
| 4,917,622 A | | 4/1990 | Davis | |
| 5,041,002 A | | 8/1991 | Byrne | |
| 5,095,822 A | * | 3/1992 | Martin | ........................ 104/275 |
| 5,115,260 A | * | 5/1992 | Hayward et al. | ............ 174/255 |
| 5,158,476 A | | 10/1992 | Kirby | |
| 5,414,218 A | | 5/1995 | Nathan | |
| 5,478,254 A | | 12/1995 | Holt | |
| 5,703,330 A | * | 12/1997 | Kujawski | ..................... 138/157 |
| 6,049,040 A | * | 4/2000 | Biles et al. | .................. 174/101 |
| 6,184,474 B1 | * | 2/2001 | Craft, Jr. | ..................... 174/135 |
| 6,268,566 B1 | * | 7/2001 | Takiguchi et al. | ......... 174/72 A |

OTHER PUBLICATIONS

Richard J. Lewis, Sr., Hawley's Condensed Chemical Dictionary, 1997 by John Wiley & Sons, Inc., Thirteenth Edition; pp. 498, 753, 782, 792, 961, 995.*

* cited by examiner

Primary Examiner—Dean A. Reichard
Assistant Examiner—Adolfo Nino
(74) Attorney, Agent, or Firm—TraskBritt

(57) ABSTRACT

A device and method for controlling strain in a transmission line such as a power or signal transmitting wire, cable or other conduit. The device includes a body having at least one cavity formed therein for receipt of at least a portion of a transmission line. Multiple openings formed in the body allow the transmission line to extend from the at least one cavity and external to the body. The at least one cavity is defined to include a peripheral boundary formed at least partially by a first substantially linear wall and a second opposing wall which deviates from the first wall thereby forming a deviation path for the transmission line disposed therein. A cover may be provided to cooperatively mate with the body such that it conceals the cavity or cavities formed therein.

49 Claims, 8 Drawing Sheets

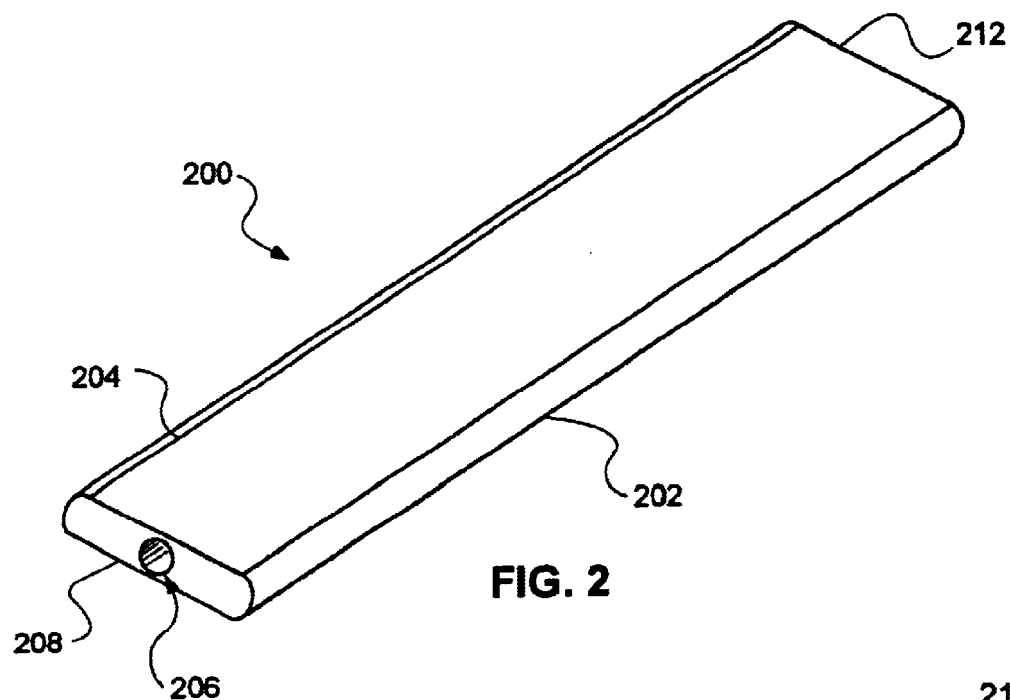
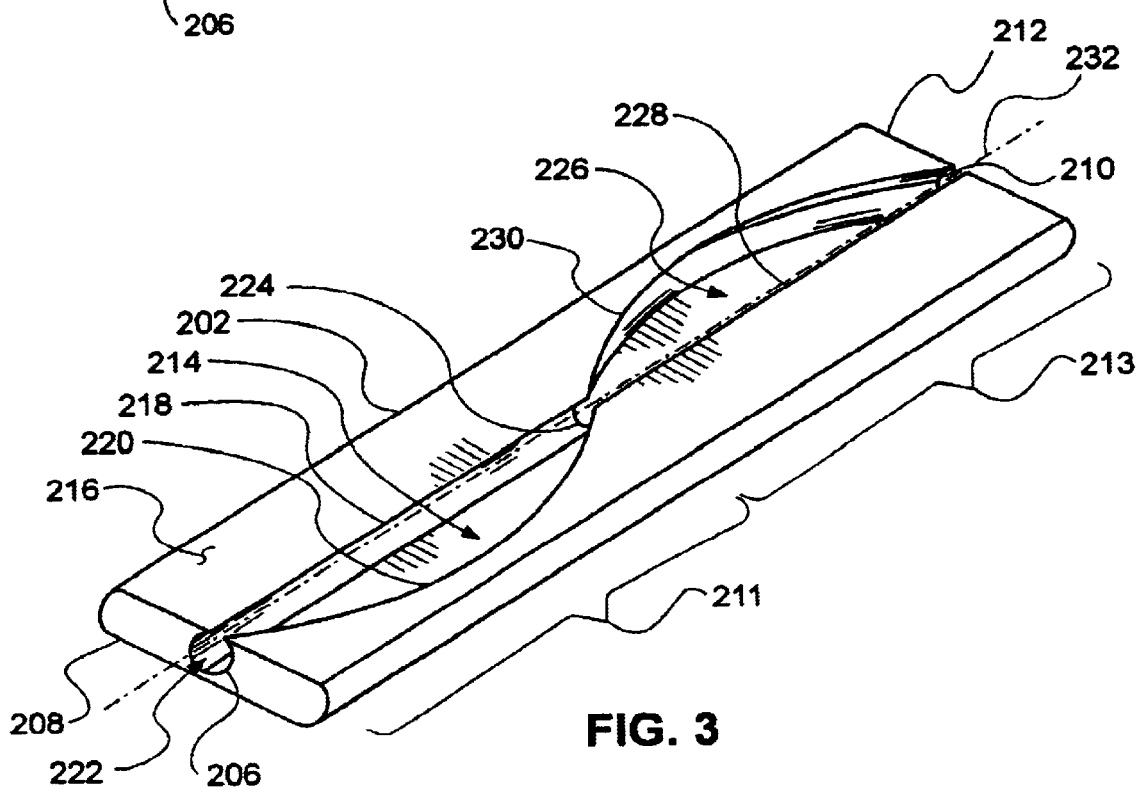

STRAIN CONTROL DEVICE FOR ATTACHING TRANSMISSION LINES TO DEFORMABLE STRUCTURES AND METHODS EMPLOYING SAME

BACKGROUND OF THE INVENTION

1. Field of the Invention

The present invention relates generally to the attachment of wires, cables or other conduits to flexible structures, or between multiple structures expected to exhibit relative motion therebetween, and, more particularly, to the employment of such wires, cables or conduits in high strain inducing environments while protecting the wires cables or conduits from such strain and while also providing protection from dynamic or other natural and induced environments.

2. State of the Art

Wires, cables and other conduits, referred to collectively herein as transmission lines, are conventionally used to transmit power or signals in various applications. Such transmission lines may transmit power or signals, for example, electrically, hydraulically or pneumatically. Often such transmission lines are attached to an associated structure for which the transmission lines are carrying power or are communicating signals. For example, transmission lines are conventionally found in, and are in some manner attached to, buildings, cars, transport vehicles, railway cars, aerospace vehicles and numerous other structures to deliver power to, or communicate with, various components of such structures.

In numerous applications, the structure to which the transmission lines are attached may experience forces or motions which place a strain on the transmission lines. Alternatively, the transmission lines may be coupled between multiple structures, or between multiple components of a single structure, wherein the relative movement between the multiple structures may induce strain therein.

For example, transmission lines are conventionally attached to a rocket motor's casing for powering and controlling components associated with the rocket motor. A conventional rocket motor may include a casing fabricated from a composite material formed of fibers or filaments and a bonding agent and which is configured to accommodate a relatively large amount of strain during operation of the rocket motor. For example, operational stresses applied to the casing of a conventional rocket motor may result in a strain exhibited as an elongation of the casing of up to 2%. Additionally, pressure from within the rocket motor may cause a radial deformation of the casing. Transmission lines conventionally attached to such a casing may experience mechanical degradation and potential failure when exposed to high strain magnitudes.

In an effort to reduce the strain experienced by transmission lines in such service, various techniques and systems have been employed. However, such conventional techniques and systems are expensive and require an extensive amount of time and labor to install. For example, a given rocket motor may require upwards of 2,500 individual parts, including various brackets, clamps and covers, to install the requisite raceways which house transmission lines associated with the rocket motor. Additionally, installation of such a raceway system may require several weeks of intensive labor.

Referring to FIG. 1, a cross section of such a prior art raceway 100, coupled to a rocket motor 102, is shown. The raceway 100 is configured to house multiple transmission lines 104, which transmission lines may include various configurations and sizes of wires, cables and conduits. The transmission lines 104 may even include destruct charges 104A which are configured to destroy the rocket motor 102 in the case of an errant rocket path, as will be appreciated by those of ordinary skill in the art.

Clamping mechanisms 106 may be employed to bundle multiple transmission lines 104 together. The transmission lines 104 and/or the clamping mechanisms 106 may be coupled to various brackets 108, which may in turn be attached to the casing 110 of the rocket motor 102 by means of fasteners or through use of an adhesive. Covers 112 of various configurations serve to conceal and protect the transmission lines 104 from an external atmosphere and provide a more aerodynamic profile on the rocket motor exterior.

Numerous design requirements must be met in implementing the raceway 100 with the rocket motor 102. For example, each bracket 108 may need to be individually tested upon assembly. Any adhesive or shear ply used in the installation of the raceway 100 must be able to withstand local elongation transferred from the rocket motor casing 102. Further, the raceway covers 112 must be designed to slide relative to other components during operation of the rocket motor 102 so as to prevent mechanical damage to themselves or other components of the raceway 100. For example, slots may be formed in the covers 112 allowing fasteners to be placed therethrough thereby maintaining the cover in a substantially fixed radial position relative to the rocket motor 102, but allowing the covers 112 a limited amount of longitudinal movement relative to the rocket motor 102, the brackets 108 and other components attached thereto.

Additionally, the raceway 100 must meet pressure and thermal design criteria. For example, the raceway 100 must be able to withstand both internal and external pressures which may result in a differential pressure of up to 10 pounds per square inch, or higher. In order to prevent thermal degradation, all covers may include a cork thermal protection which is conventionally manually applied. Further, a room temperature vulcanizing (RTV) sealant is conventionally applied along all edges during assembly. Also, air flow and temperature within the raceway 100 must be considered it is often desirable to limit the exposure of the transmission lines 104 to hot air or other gases which may be present within the raceway 100.

Thus, as can be seen, a great deal of design, preparation, manufacture and assembly work goes into installing transmission lines on a rocket motor to ensure proper operation.

As mentioned above, installation of transmission lines on or between other structures may experience similar difficulties. For example, relative movement between a truck and a trailer (or between two railway cars) may induce unwanted strain in transmission lines coupled therebetween. Additionally, pressurized pipelines, rotating or moving aircraft surfaces and earthquake-proof buildings, to name a few examples, may induce unwanted strains in transmission lines associated therewith and extending between mutually movable components, or components which elongate in various directions under applied stresses.

In view of the shortcomings in the art, it would be advantageous to provide a device and a method for attaching transmission lines to or between structures and which allows the structure to experience relatively high strains, including strains induced by stretching, compression, or other flexure, while maintaining the associated transmission lines in a low-strain environment. Such a device and method might also desirably provide thermal and environmental protection to the transmission lines.

It would be additionally advantageous to provide a device and a method for controlling the strain experienced by transmission lines which is simple and relatively inexpensive to fabricate and install and/or implement. It would also be advantageous to provide such a device and a method which is easily tailored to specific applications and installations.

BRIEF SUMMARY OF THE INVENTION

In accordance with one aspect of the invention, a strain control device is provided. The strain control device includes a body having a first end and a second end. A first opening is defined in the first end and a second opening is defined in the second end. At least one cavity is formed in the surface of the body such that the at least one cavity is in communication with the first and second ends. A periphery of the at least one cavity is defined, at least partially, to include a first substantially linear wall and a second opposing wall which deviates from the first substantially linear wall. The second opposing wall may include a curved configuration with at least a portion exhibiting a constant radius.

In accordance with another aspect of the invention, another strain control device is provided. The strain control device includes a body having a first end and a second end. A first plurality of openings is defined in the first end and a second plurality of openings is defined in the second end. A plurality of cavities is formed in a surface of the body, with each cavity of the plurality being in communication with an opening of the first plurality of openings and an opening of the second plurality of openings. Each of the plurality of cavities also includes a periphery which is at least partially defined by a first substantially linear wall and a second opposing wall which deviates from the first substantially linear wall.

In accordance with another aspect of the invention, another strain control device is provided. The strain control device includes a body having a first end and a second end. At least one cavity is formed in the body between the first end and the second end. The at least one cavity is configured to receive at least a portion of a transmission line therein and defines a deviation path for that portion of the transmission line.

In accordance with another aspect of the invention, a rocket motor is provided. The rocket motor includes a rocket casing and a body attached to a surface of the rocket casing. The body includes a first end and a second end with a first opening being defined in the first end and a second opening defined in the second end. At least one cavity is formed in a surface of the body, with the at least one cavity being in communication with the first and second openings. A peripheral boundary of the at least one cavity is at least partially defined by a first substantially linear wall and a second opposing wall which deviates from the first substantially linear wall.

In accordance with another aspect of the invention, another strain control device is provided. The strain control device includes a body having a first grasping member configured to frictionally engage a first portion of a transmission line and a second grasping member configured to frictionally engage a second portion of the transmission line. At least one cavity is defined in the body between the first grasping member and the second grasping member, wherein the cavity is configured to accommodate a third portion of the transmission line therein and defining a deviation path for the third portion of the transmission line.

In accordance with another aspect of the present invention, a method of controlling strain in a transmission line is provided. The method includes providing a body, forming an first opening in a first end of the body, forming a second opening in a second end of the body, and forming a cavity in a surface of the body between and in communication with the first and second openings. The cavity is defined by a peripheral boundary which includes a first substantially linear wall and a second opposing wall which deviates from the first substantially linear wall. The method further includes positioning a transmission line within the cavity such that it extends from the first opening, through the cavity and through the second opening.

In accordance with another aspect of the present invention, another method of controlling strain in a transmission line is provided. The method includes providing a body having a first grasping member and a second grasping member, forming a cavity in the body in communication with the first and second grasping member, wherein the cavity is configured to provide a deviation path to the transmission line. A first portion of the transmission line is frictionally engaged with the first grasping member, a second portion of the transmission line is frictionally engaged with the second grasping member, and a third portion of the transmission line is disposed within the cavity.

In accordance with another aspect of the present invention, a method of forming a strain control device is provided. The method includes providing a body, forming a first opening in a first end of the body, forming a second opening in a second end of the body, and forming at least one cavity in a surface of the body in communication with the first and second openings.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 2 is a perspective view of one embodiment of a strain control device according to the present invention;

FIG. 3 is a perspective view of the device shown in FIG. 2 with its associated cover removed;

DETAILED DESCRIPTION OF THE INVENTION

Figure 1:
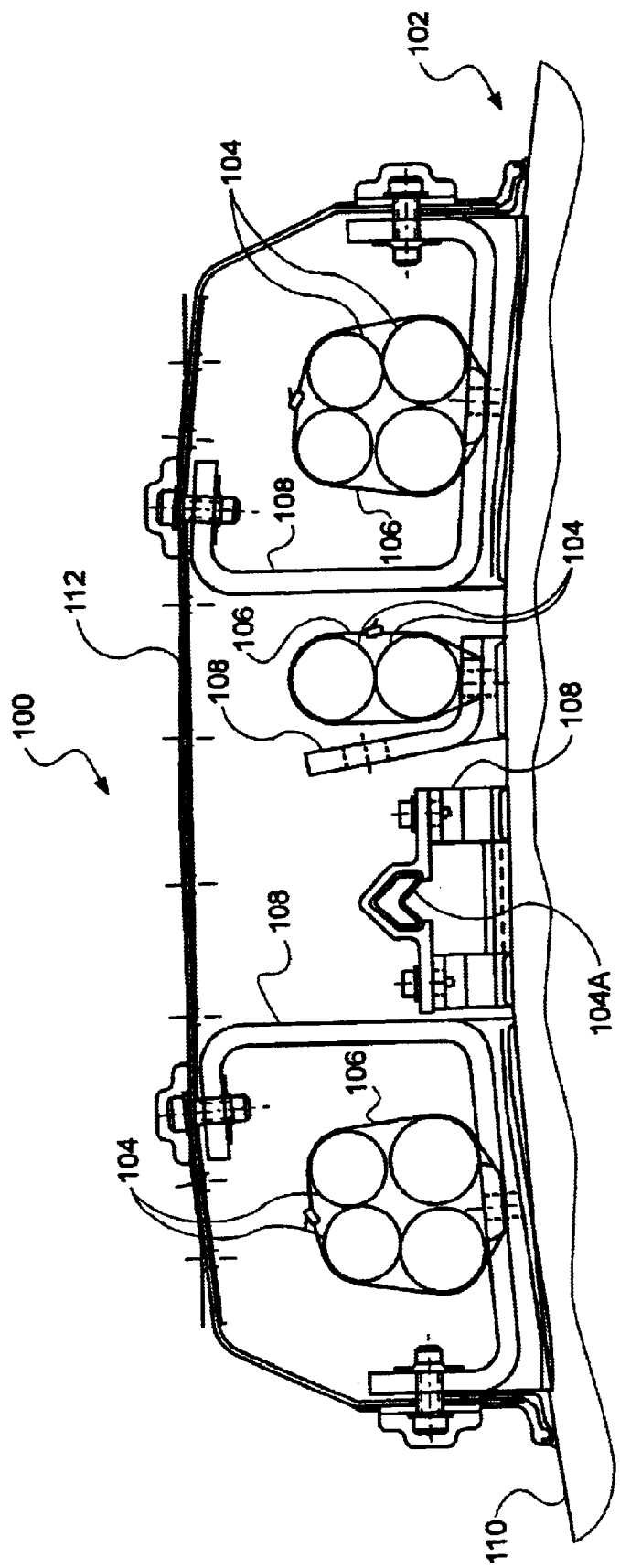
FIG. 1 is a cross sectional view of a prior art raceway used to house transmission lines associated with a rocket motor.

Referring to FIG. 2, a strain control device 200 is shown which may include a body 202 and a cover 204 cooperatively mated with the body 202. An opening 206 or a port is formed through the end 208 of the body 202. A similar opening 210 (FIG. 3) is formed through the opposite end 212 of the body 202.

Referring to FIG. 3, the body 202 is shown with the cover 204 removed therefrom. The body 202 may be described as including a first body section 211 and a second body section 213. The first body section 211 includes a first cavity 214 formed in the upper surface 216 of the body 202. The first cavity 214 is defined by a substantially linear wall 218 and an opposing curved wall 220 which laterally deviates from the substantially linear wall 218. At one end of the first cavity 214 the substantially linear wall 218 and the opposing curved wall 220 adjoin the opening 206 thereby causing the cavity 214 to be exposed through the end 208 of the body 202.

It is noted that, with the cover 204 removed from the body 202, the opening 206 might be described as being substantially "C-shaped" having a mouth 222 formed in the upper surface 216 of the body 202. The opening 210 at the opposing end 212 is similarly configured. The mouth 222 of the openings 206 and 210 allow a transmission line to be inserted therethrough from the top (as shown) of body 202 for installation of the transmission line into the strain control device 200 as shall become more apparent below. While a transmission line might be longitudinally threaded through an opening or port 206 and 210 which does not include a mouth 222 (i.e., an aperture having a continual ring like configuration), an opening configured to include a mouth 222 is desirable for assembly purposes, particularly in helping to reduce the time of installing a transmission line, as the transmission line may be effectually "snapped" into place in body 202 rather than threaded therethrough. The cover 204 (FIG. 2) may then be coupled with the body 202 so as to conceal the cavities 214 and 226, and any transmission line installed therein, from an external environment.

The second body section 213 includes a second cavity 226 which is configured similarly to the first cavity 214 and includes a substantially linear wall 228 and a curved opposing wall 230. Toward the center of the body 202 another C-shaped opening 224 serves as a transition aperture from the first cavity 214 to a second cavity 226. In the embodiment shown, the second cavity 226 is configured as a reversed image of the first cavity 214 with respect to a longitudinal centerline 232 that running through the openings 206 and 210. Thus, the two cavities 214 and 226 adjoined together at the center opening 224 define a general shape which appears somewhat sinusoidal in nature. Particularly, the two curved walls 220 and 230 serve to define a substantially sinusoidal curve opening onto the upper surface 216 of the body 202.

Figure 4:
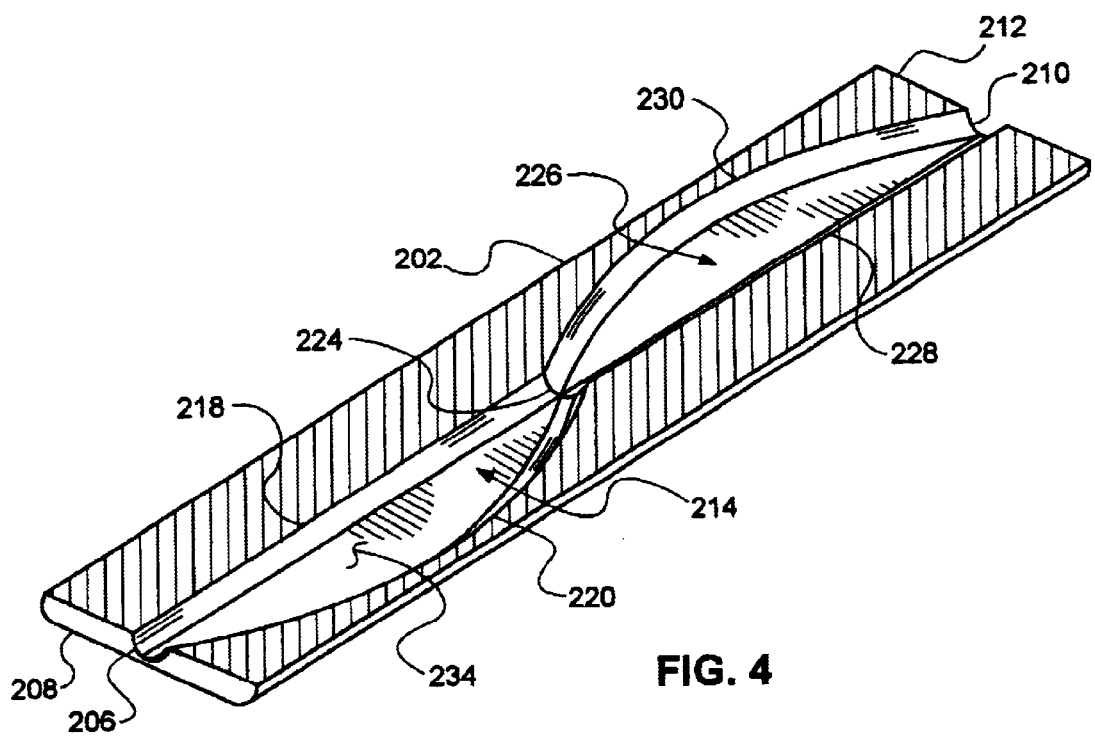
FIG. 4 shows a cross section of the device shown in FIGS. 2 and 3.

Referring briefly to FIG. 4, a longitudinal cross sectional view of the body 202, taken parallel to the plane of the body, is shown. The various walls 218, 220, 228 and 230 can be seen to exhibit an arcuate or curved surface as they extend upwardly from the base 234 of the adjoining cavities 214 and 226. The upwardly curved configuration of the walls 218, 220, 228 and 230 allows the walls to more naturally transition into the openings 206, 210 and 224. Additionally, while the walls 218, 220, 228 and 230 might be formed to exhibit an angular transition from the base 234 of the cavities 214 and 226, a curved transition may serve to reduce degradation of the material of the body 202 proximate the transition between the base 234 and the walls 218, 220, 228 and 230 due to repeated strain or elongation of the strain control device 200.

The cavities 214 and 226 as thus configured provide a deviation path for a transmission line installed therein. The concept of a deviation path might be better understood with reference to FIG. 5 which depicts a graphic 238 similar in configuration to the shape defined by the walls 218, 220, 228 and 230 of the cavities 214 and 226. A nominal transmission line path 240 represents where a transmission line might be located upon installation of the transmission line and when no strain is induced into the strain control device 200. The nominal transmission line path 240, as shown, is slightly curved such that a shallow substantially sinusoidal-type curve is formed. A linear boundary 242 and a curved boundary 244 determine the extent of allowable deviation from the nominal transmission line path 240. Thus, when the strain control device 200, and more particularly the body 202, experiences an elongating or contracting strain, a transmission line installed therein may deviate from the nominal transmission line path 240 to a new path located between the two boundaries 242 and 244 without experiencing the strain exhibited by the body 202. While the nominal transmission line path 240 is shown to be oriented substantially midway between the straight line 242 and the curved 244 boundaries, it may be placed closer to either boundary 242 and 244 depending on the expected strains that will be seen by the strain control device 200 during operation.

Figure 5:
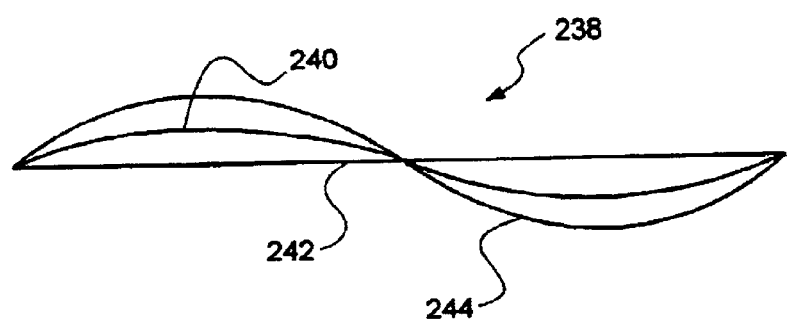
FIG. 5 is a graphic depicting the potential deviation path of a transmission line installed in the device shown in FIGS. 2 and 3.
Figure 6A:
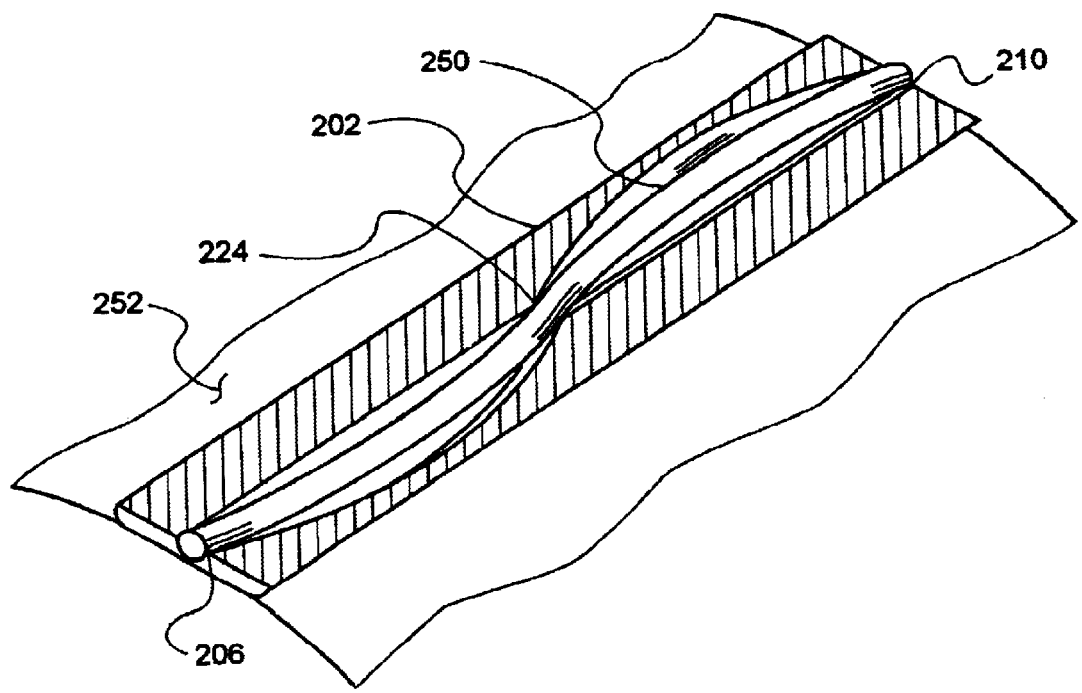
FIGS. 6A and 6B show a cross sectional view of the device shown in FIG. 3 with a transmission line installed therein.
Figure 6B:
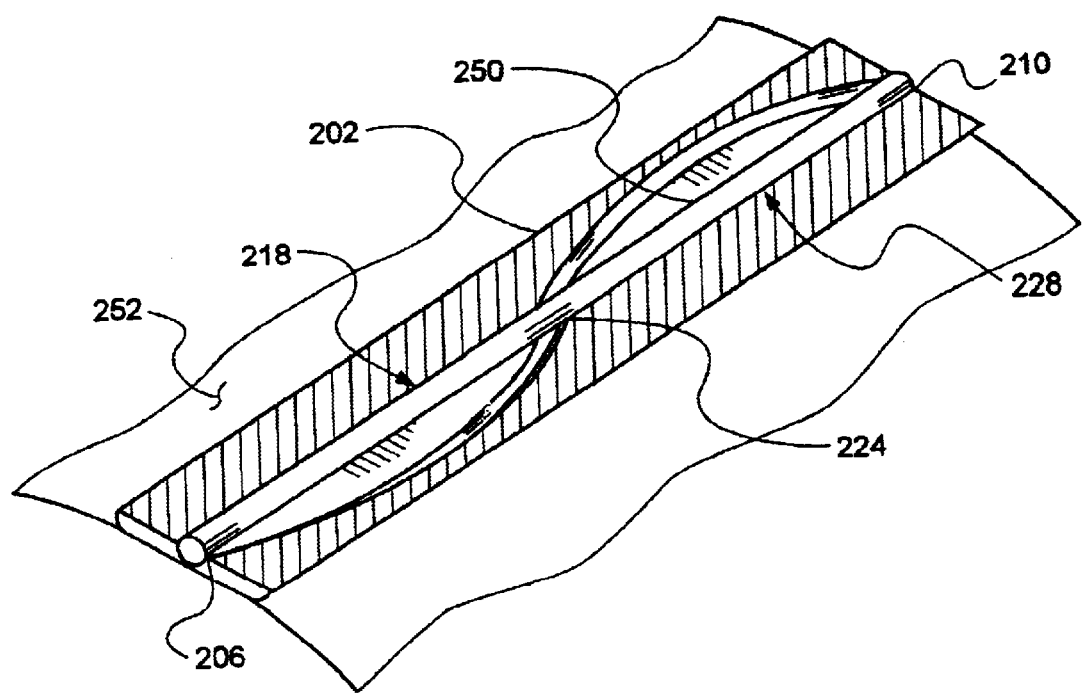

Referring to FIGS. 6A and 6B, a transmission line 250 is shown as installed in the body 202 illustrating the concept of the deviation path shown in FIG. 5. In FIG. 6A, the transmission line 250 is installed in its nominal transmission path 240 (FIG. 5). As described above, the transmission line 250 may be installed by inserting the transmission line 250 through the mouth 222 (FIG. 3) of the various C-shaped openings 206, 210 and 224. The C-shaped openings 206, 210 and 224 are sized and configured to snugly grasp the transmission line 250 and hold it in place once it has been installed. In operation, the C-shaped openings might be considered constriction points as will become more evident below.

The body 202, as shown, is attached to a structure such as, for example, a composite rocket motor casing 252, although other structures are contemplated. The body 202 may be attached by adhesive, through the use of fasteners or through other techniques as understood by those of skill in the art.

During operation of a rocket motor, the casing 252 is subject to numerous forces, including internal and external pressure environments, which induce strain in the casing 252. The induced strain may result in elongation, contraction or other flexure of the casing 252. The body 202 is designed to withstand strains similar to that seen in the rocket motor casing 252. To accommodate such strain, the body 202 may be formed of an elastomeric material such as neoprene rubber, although other materials are contemplated. Additionally, forming the body of such a flexible conformable material may allow the body 202 to be installed on structures of various configurations, for example by cooperatively mating with the radial surface of the rocket motor casing 252.

Referring to FIG. 6B, when the rocket motor casing 252 is strained, for example in an elongating fashion, the body 202 is formulated, configured and attached to the rocket motor casing 252 to correspondingly elongate therewith. During elongation of the body 202 the openings 206, 210 and 224 substantially maintain their grasp on the transmission line 250 and cause the transmission line 250 to deviate from its nominal transmission path 240 (FIG. 5) and straighten such that it follows a path along the substantially linear walls 218 and 228; in other words, it approaches and/or reaches the linear boundary 242 (FIG. 5) of its deviation path.

A similar reaction occurs when a longitudinally contracting strain is induced into the body 202. However, upon contraction of the body 202, the transmission line 250 would become displaced, or deviate, from its nominal transmission path 240 (FIG. 5) toward the curved walls 220 and 230, or toward the curved boundary 244 (FIG. 5) of its deviation path.

Thus, the body 202 is formulated and configured to absorb the strain induced by the structure to which it is attached (or induced by the relative movement of multiple structures between which it is attached) while substantially isolating the strain from the transmission line 250. The body 202 may be designed such that it isolates the transmission line 250 from all of the expected strain produced by a given structure, or it may be designed such that a limited amount of strain may be ultimately transferred to the transmission line 250.

Figure 7:
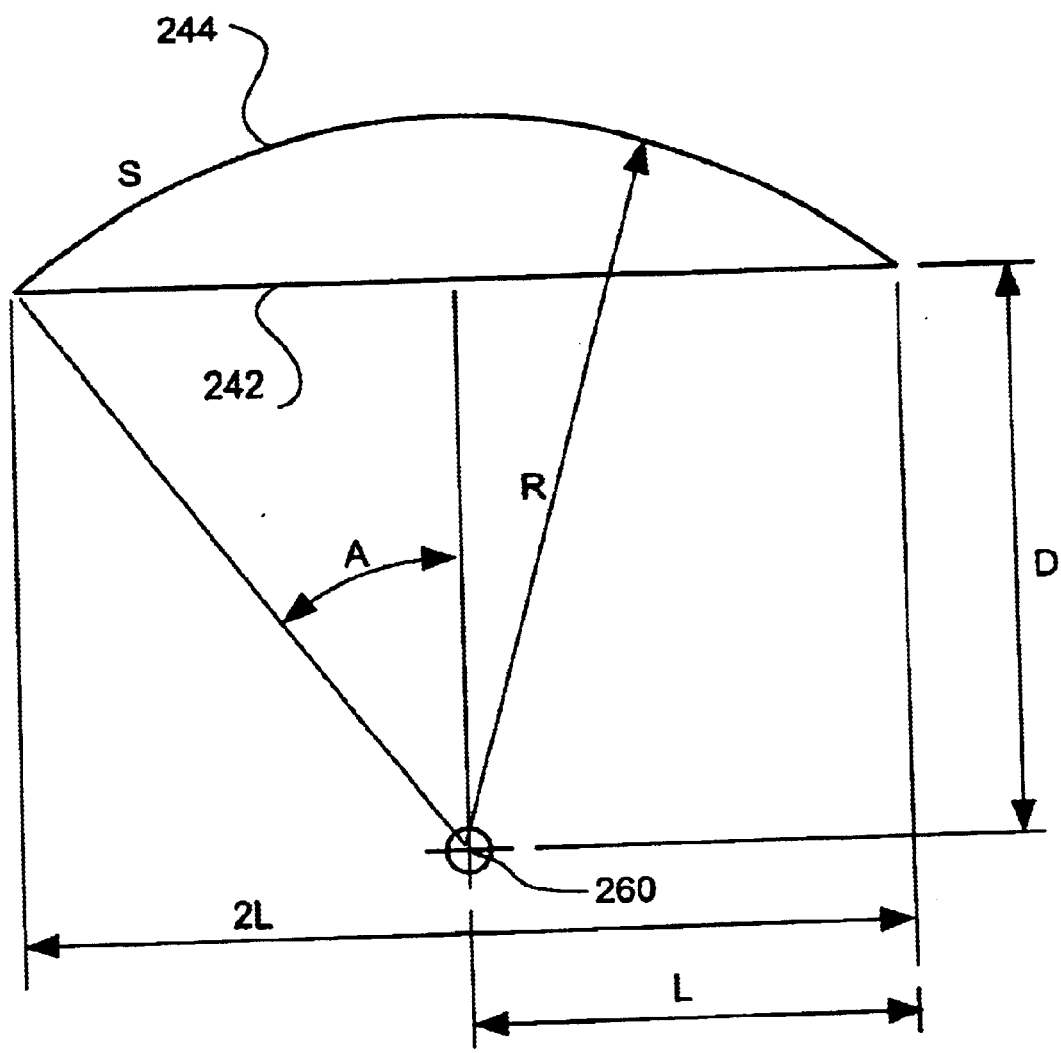
FIG. 7 is graph of a potential transmission line path indicating various parameters associated with determining a maximum path deviation according to one aspect of the present invention.

Referring now to FIG. 7, the design and configuration of the maximum geometric deviation path length for a curved boundary 244 exhibiting a constant radius is described. The curved boundary 244 is defined as being an arc extending through an angle of 2A (in radians), having a radius of R and an arc length of S. The corresponding linear boundary 242 may be defined to have a length 2L. The distance between the linear boundary 242 and the center 260 of the curved boundary 244 is defined as D. The equations used to determine the maximum deviation path length for such a configuration are as follows:

EQ. 1: $A = \cos^{-1}\left(\frac{D}{R}\right)$

EQ. 2: $S = 2RA$ and

EQ. 3: $\text{Elongation(strain)} = \frac{S - 2L}{2L}$

Thus, starting with an anticipated value of maximum elongation (either calculated or measured) and an initial length (2L) of the linear boundary 242, one can solve for the arc length (S) of the curved boundary 244 using EQ. 3. Selecting a desired radius (R) and having solved for the arc length (S), EQ. 2 may be solved for the half angle (A) of the curved boundary 244 which may in turn be used to solve for the distance (D) between the center 260 of the curved boundary 244 and the linear boundary 242 using EQ. 1.

For example, in designing the deviation path for a cavity 214 in the body 202 shown in FIG. 2, one may start with an initial strain of approximately 2.5% (or 0.025 inches per inch). With a linear boundary 242 length 2L of 12 inches, and a desired radius of approximately 16 inches, the above equations can be solved to determine that the arc length S of the curved boundary 244 is approximately 12.3 inches, which traverses through an angle 2A of approximately 0.76875 radians (or approximately 44°).

Figure 8:
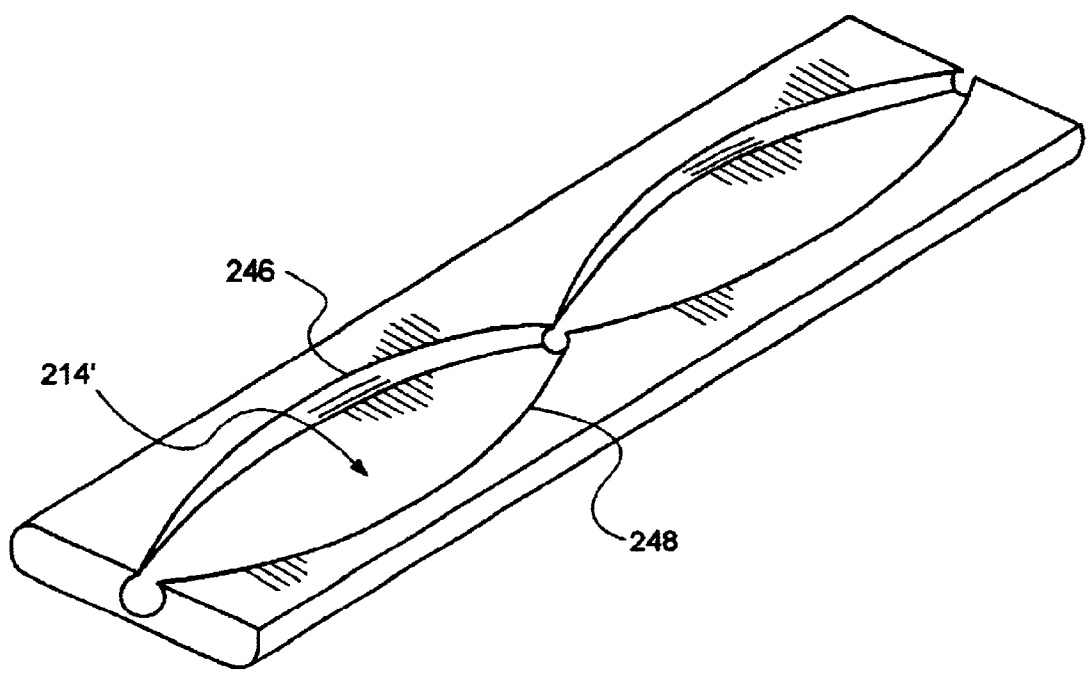
FIG. 8 is a perspective view of another embodiment of the present invention.

It is noted that while the above exemplary equations are for a deviation path having a curved boundary 244 of a constant radius, other nonlinear boundary configurations may be utilized. For example, a zigzag pattern, ellipses, parabolas, hyperbolas or any path that deviates from the linear boundary 242 may be utilized. Additionally, the cavity and the deviation path defined thereby need not include a substantially linear wall. For example, with reference to FIG. 8, a cavity 214' may be formed having a first nonlinear wall 246 and a second opposing nonlinear wall 248 if so desired. Additionally, while most of the cavities have been defined having walls which define a generally two dimensional deviation path, a three-dimensional deviation path may be defined within the cavity if so desired.

Additionally, while certain examples have been set forth above, the strain control device 200 may be formed of various materials using various methods of construction. For example, as mentioned above, the body 202 may be formed of a neoprene rubber. However, numerous materials having various densities and mechanical properties may be used depending on the conditions of service the strain control device 200 is expected to experience. Thus, the body 202 may be formed of a low density foam, a high density rubber, or any of a number of materials of varying density in between. Another exemplary material may include a polyurethane which is amenable to forming dual density molds.

The body 202 may include Microballoons®, or other hollow, finely divided, hole-free, low-density particles of synthetic resins to vary the density as desired; fiber reinforcement, such as glass or carbon fibers, to tailor the mechanical properties; or the addition of various filler materials such as, for example, silica for thermal resistance. With such flexibility in composition, the strain control device 200 may be customized and tailored for various environments and conditions. For example, it may be desirable to limit the amount of strain or elongation exhibited by the body 202 during operation. Thus, the inclusion of fiber reinforcing members in the body may allow the amount of elongation exhibited by the body 202 to be limited to a predetermined amount, thereby preventing potential damage to the body 202 and/or any transmission lines disposed therein.

Further, the body 202 may even be formed of a material which varies in density and/or composition from one portion of the body 202 to another thereby allowing a very high degree of customization.

The ability to form the body 202 from numerous materials also allows for flexibility in manufacturing. Desirably, the body is formed from a molding process or from an extrusion process which allows for simple and cost effective manufacturing relative to prior art systems such as was described with respect to FIG. 1 above. Additionally, while shown as being generally flat or planar, the body 202 may be formed to a predetermined shape, such as a desired radius, for easier and more effective installation on a given structure. Alternatively, one or more surfaces may be so configured. For example, the undersurface of the body 202 may be defined as a shallow, concave curve of substantially the same radius as and exterior of a rocket motor casing 252.

Likewise, the cover 204 may be formed of various materials and through various fabrication processes. In certain applications it may be desirable to form the body 202 and the cover 204 from different materials. For example, when using the strain control device 200 in conjunction with a rocket motor, it may be desirable to form the body 202 from a material such as silica filled nitrile rubber (NBR), which accommodates relatively high levels of strain while also providing some thermal protection. However, it may be desirable in such circumstances to form the cover 204 from a highly thermal resistant material such as, for example, an aramid fiber, commercially known as Kevlar®.

Figure 9:
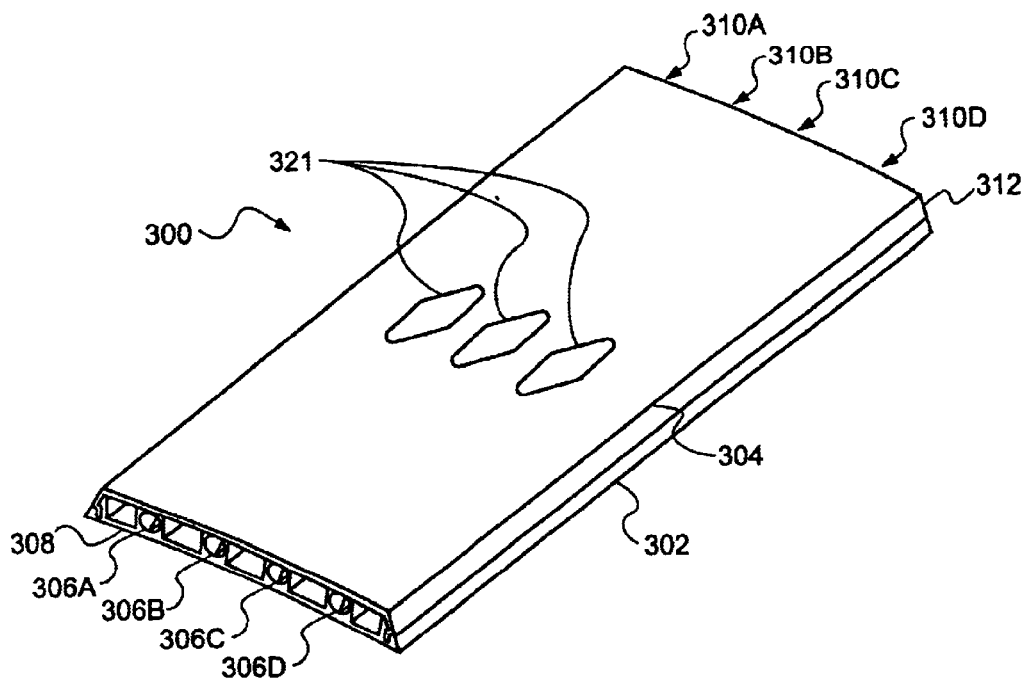
FIG. 9 is a perspective view of another embodiment of the strain control device of the present invention.

Referring now to FIG. 9, a strain control device 300 according to another embodiment is shown. The strain control device 300 includes a body 302 and a cover 304 cooperatively mated and interlocked with the body 302. A plurality of openings 306A–306D or ports are formed along a first end 308 of the body 302 and a second plurality of openings 310A–310D are formed through the opposing end 312 of body 302.

Figure 10:
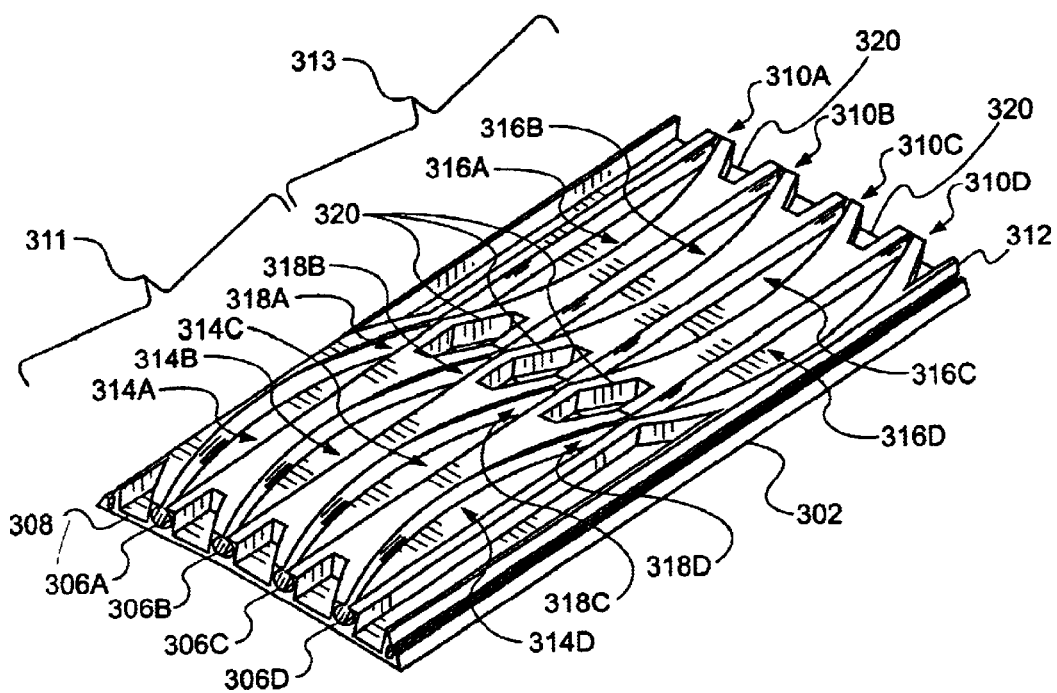
FIG. 10 is a perspective view of another embodiment of the strain control device of the present invention with its associated cover removed.

As seen in FIG. 10, which depicts the body 302 with the cover 304 removed therefrom, the first plurality of openings 306A–306D open up into an associated plurality of cavities 314A–314D formed in a first body section 311. Similarly, the second plurality of openings 310A–310D open to another plurality of cavities 316A–316D formed in a second body section 313. The first and second set of cavities 314A–314D and 316A–316D are adjoined by an additional set of openings 318A–318D respectively.

The strain control device 300 is thus similar to the embodiment described above with respect to FIGS. 2 and 3 but allows for multiple transmission lines to be installed in a single strain control device 300. Additionally, the strain control device 300 includes a plurality of air passages 320 which both reduce the weight of the strain control device 300 and may be in communication with cavities 314A–314D and 316A–316D to serve as an interim air passage from the cavities 314 and 316 through the cover 304. One or more openings 321 may be placed within the cover 304 in communication with the air passages 320 thereby allowing air to flow from the cavities 314 and 316 without directly exposing a transmission line 250 contained therein to the external environment.

Additional voids or compartments may likewise be designed into the strain control device 300 to accommodate, for example, ordnance systems (such as destruct charges 104A—see FIG. 1) associated with rocket motors as will be understood by those of skill in the art.

As will be appreciated by those of ordinary skill in the art, the strain control devices disclosed herein may be arranged in various configurations as is required for specific installations and applications. For example, referring to the embodiment described with respect to FIGS. 8 and 9, multiple strain control devices 300 may be arranged in an end 312 to end 308 pattern such that a transmission line may be extended for a desired length along a structure. Additionally, if so desired, multiple strain control devices 300 may be layered in a laminated manner in order to accommodate a high volume of transmission lines.

Additionally, the thickness of the strain control devices 300 may be varied as may be desired. The variance of thickness may be desirable in designing for specific thermal conditions or, in the case of installation on a rocket motor or other aerospace vehicle, in designing the aerodynamics of the resulting structure. Further, with reference to the destruct charge 104A shown in FIG. 1, those of skill in the art will appreciate that it is necessary to maintain a minimum distance between the chevron of the shaped destruct charge and the casing of the booster rocket motor in order for the destruct charge 104A to be effective. Thus, by providing added thickness in the body 302 of the strain control device, such designs and configurations are more easily obtained.

Alternative embodiments may also include a body which includes a single cavity formed therein rather than a longitudinally extending pattern of multiple cavities. Thus for example, referring briefly to FIG. 3, only the first cavity 214 may exist in the body. Again, this may add to the flexibility of installing transmission lines in varied applications and configurations. Alternatively, three or more cavities may be formed in a longitudinally arranged repeating pattern. In such a case, the repeating pattern may include a reversal of cavities about a longitudinally extending centerline from one cavity to the next adjacent cavity. Such flexibility obtained from the modular nature of the strain control devices allows for multiple bodies 202, 302 to be arranged in varying patterns. For example, bodies of varied length may be installed in an end to end pattern to achieve a desired length. Further, multiple transmission lines installed in the body 302 described with respect FIG. 10 may not all be of equal length. Thus, it may be desirable to arrange one or more bodies 202 described with respect to FIG. 3 in an end-to-end fashion with one or more bodies 302 of FIG. 10 so as to terminate some of the transmission lines at a given location while extending other transmission lines past the location.

Figure 11:
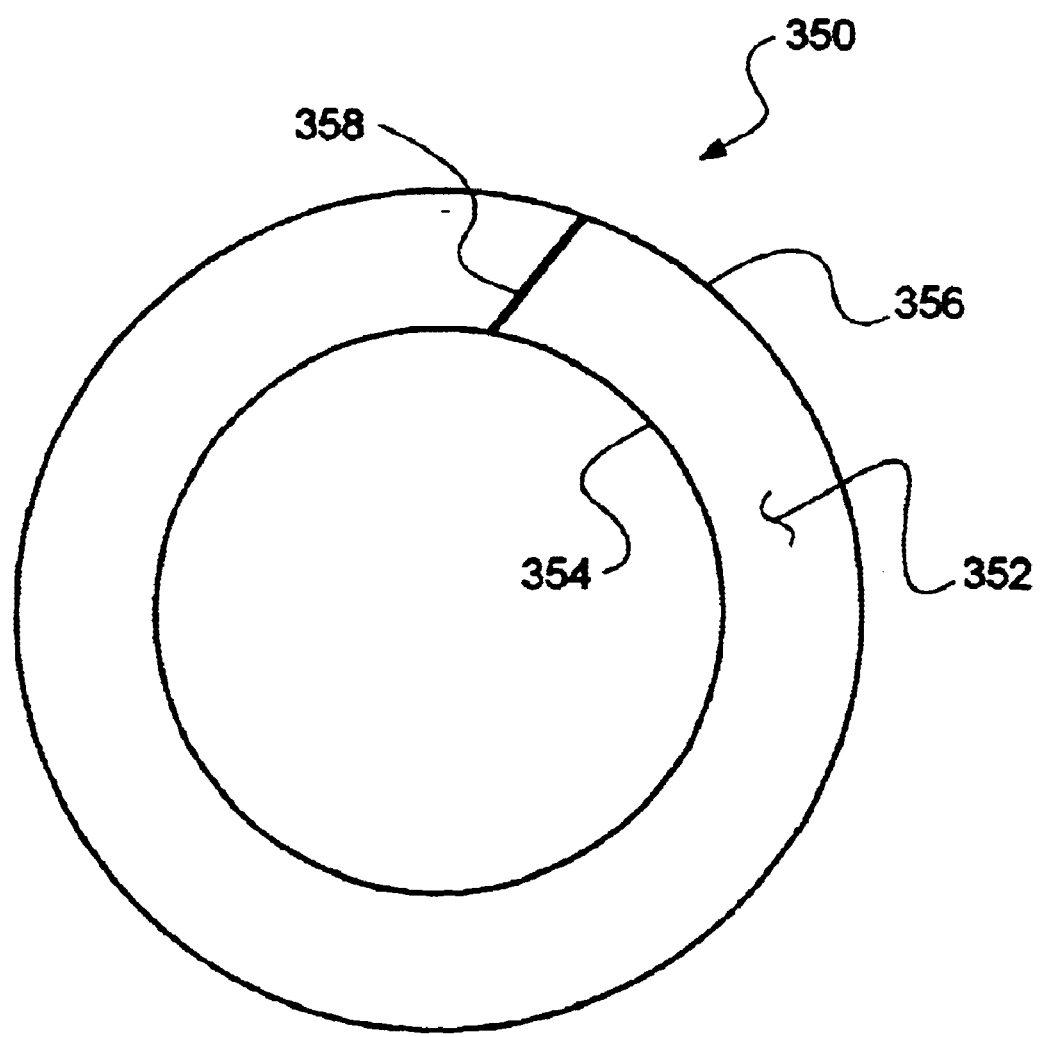
FIG. 11 shows an adapter which may be used in conjunction with various embodiments of the present invention.

Referring now to FIG. 11, an adapter 350 is shown which may be utilized in conjunction with the various embodiments of the present invention. The adapter 350 may be described as including a generally annular body 352 having an inner radius 354 and an outer radius 356. The adapter 350 may also include a cut portion 358 through the annular body 352 extending from the inner radius 352 to the outer radius 354. The cut portion 358 may be a simple cut as shown, or it may include the removal of a larger portion of the annular body 352 such that the annular body 352 is substantially C-shaped with a mouth portion (i.e., like the openings 206, 210 and 224 described above with respect to FIG. 2).

The adapter 350 is designed such that the inner radius 354 is sized and configured to fit around a transmission line of a particular size. The outer radius 356 of the adapter 350 is configured to fit within one of the openings 206, 210 and 224 (FIG. 3) of a strain control device. The adapter 350 may then function as the opening into which it is inserted but with a different internal diameter so as to frictionally or snugly grasp a transmission line of a smaller diameter positioned within a body 202, 302. The adapter 350 may be sized and configured so as to effect an interference or compression fit between the adapter 350 and the opening 206, 210, 224 into which it is inserted. Thus, by using the adapter 350, a strain control device having openings 206, 210, and 224 exhibiting a particular size and configuration may accommodate transmission lines of numerous sizes and/or configurations.

For example, the body 302 described with respect to FIG. 10 may include multiple transmission lines, wherein each transmission line exhibits a different diameter. However, the use of adapters allows the openings 306A–306D, 310A–310D and 318A–318D to be formed of a single size and configuration if so desired. Likewise, the adapters may be utilized to accommodate transmission lines having a cross section which is not substantially circular. For example, the shaped destruct charge 104A of FIG. 1 may be installed by using an adapter having an outer surface configured to cooperatively engage a C-shaped opening while the internal surface of the adapter 350 is configured to cooperatively engage with the shaped destruct charge.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A strain control device comprising:
   a substantially rigid body extending longitudinally between a first end and a second end thereof;

a first opening defined in the first end;

a second opening defined in the second end; and at least one cavity formed in a surface of the body extending between the first and second openings, a periphery of the at least one cavity being at least partially defined by a first wall and a second opposing wall which laterally deviates from the first wall.

2. The strain control device of claim 1, wherein the first wall is configured as a substantially linear wall.

3. The strain control device of claim 1, wherein the at least one cavity includes multiple cavities arranged in a longitudinally extending end-to-end pattern including at least first cavity and a second cavity, wherein the second cavity is configured as a reverse image of the first cavity with respect to a longitudinal centerline passing through the first and second openings and wherein at least another opening is positioned between the first and second cavities.

4. The strain control device of claim 3, wherein the first, second and at least another openings are configured as substantially C-shaped openings in transverse cross section.

5. The strain control device of claim 4, further comprising a cover sized and configured to cooperatively mate with the body such that the multiple cavities are substantially concealed.

6. The strain control device of claim 5, wherein the cover is configured to thermally insulate the multiple cavities.

7. The strain control device of claim 6, wherein the cover is formed from a material including an aramid fiber.

8. The strain control device of claim 7, wherein the body is formed of a material including nitrile rubber.

9. The strain control device of claim 1, wherein the body is formed of a material including nitrile rubber.

10. The strain control device of claim 1, wherein the body is formed of a material including neoprene.

11. The strain control device of claim 1, wherein the body is formed of a material which includes silica.

12. The strain control device of claim 1, wherein the body is formed of a material which includes a plurality of reinforcing fibers.

13. The strain control device of claim 1, wherein the body is formed of a material which includes hollow filler particles.

14. The strain control device of claim 1, wherein the body is formed of a material which varies in density between a first portion of the body and a second portion of the body.

15. The strain control device of claim 1, wherein the body is a molded component.

16. The strain control device of claim 1, wherein the body is an extruded component.

17. The strain control device of claim 1, further comprising an adapter including an annular body having a first inner radius and second larger outer radius, wherein the second larger outer radius is sized and configured to cooperatively contact an inner wall of at least one of the first and second openings.

18. The strain control device of claim 1, wherein the second wall includes at least a portion which exhibits a substantially constant radius.

19. The strain control device of claim 1, further including a curved surface transition from the first and second walls to a base of the at least one cavity.

20. The strain control device of claim 1, wherein the first and second openings are sized and configured to receive and frictionally grasp a transmission line to be disposed therethrough.

21. The strain control device of claim 1, wherein the body is configured to elongate and contract, at least in a direction taken between the first and second openings.

22. A strain control device comprising:

a substantially rigid body extending longitudinally between a first end and a second end;

a first plurality of openings defined in the first end;

a second plurality of openings defined in the second end; and at least a first plurality of cavities formed in a surface of the body, each cavity of the at least a first plurality of cavities extending between an opening of the first plurality of openings and an opening of the second plurality of openings, each of the at least a first plurality of cavities having a periphery which is at least partially defined by a first wall and a second opposing wall which deviates from the first wall.

23. The strain control device of claim 22, wherein the first wall comprises a substantially linear wall.

24. The strain control device of claim 22, further comprising a second plurality of cavities and a third plurality of openings, wherein each cavity of the second plurality of cavities includes a periphery having a third wall and a fourth opposing wall which deviates from the third wall, each cavity of the second plurality of cavities being adjacent to a cavity of the at least a first plurality of cavities arranged in a longitudinally extending end-to-end pattern, and wherein each of the third plurality of openings is disposed between a one of the at least a first plurality of cavities and an adjacent one of the second plurality of cavities.

25. The strain control device of claim 22, further comprising a cover configured to cooperatively mate with the body and substantially conceal the at least a first plurality of cavities.

26. The strain control device of claim 25, wherein the cover is formed of a first material and the body is formed of a second different material.

27. The strain control device of claim 22, wherein each of the first and second pluralities of openings is configured as a substantially C-shaped opening.

28. The strain control device of claim 22, wherein the body is formed of a material comprising nitrile rubber.

29. The strain control device of claim 22, wherein the body is formed of a material comprising neoprene.

30. The strain control device of claim 22, wherein the second opposing wall of each of the at least a first plurality of cavities includes at least a portion which exhibits a substantially constant radius.

31. The strain control device of claim 22, wherein each of the first and second pluralities of openings is sized and configured to receive and frictionally grasp a transmission line passing therethrough.

32. The strain control device of claim 22, wherein the body is configured to elongate and contract at least in a direction taken between the first and second openings.

33. A strain control device comprising:

a substantially rigid body extending longitudinally between a first end and a second end thereof; and at least one cavity formed within a surface of the body between the first end and the second end, the at least one cavity configured to receive at least a portion of a transmission line therein, wherein the at least one cavity defines a deviation path for the at least a portion of the transmission line, and wherein the at least one cavity is at least partially defined by the first boundary and a second opposing boundary, and wherein the first boundary is a substantially linear boundary and the second opposing boundary deviates from the first substantially linear boundary.

34. The strain control device of claim 33, wherein the second opposing boundary includes at least a portion which exhibits a substantially constant radius.

35. The strain control device of claim 34, further comprising a first opening formed in the body at a first end of the at least one cavity and a second opening formed in the body at a second end of the at least one cavity.

36. The strain control device of claim 35, wherein the first and second openings are configured to frictionally grasp the transmission line.

37. The strain control device of claim 36, wherein the body is configured to elongate and contract at least in a direction taken substantially linearly between the first and second openings.

38. The strain control device of claim 37, wherein the deviation path is defined to allow displacement of the at least a portion of the transmission line towards the first substantially linear boundary upon the elongation of the body.

39. The strain control device of claim 28, wherein the deviation path is defined to allow displacement of the at least a portion of the transmission line towards the second opposing boundary upon the contraction of the body.

40. An apparatus comprising:
   a casing;
   at least one substantially rigid body attached to a surface of the casing, the at least one body extending longitudinally between a first end and a second end;
   a first opening defined in the first end of the at least one body;
   a second opening defined in the second end of the at least one body; and
   at least one cavity formed in a surface of the at least one body, the at least one cavity extending between the first and second openings, a periphery of the at least one cavity being at least partially defined by a first substantially linear wall and a second opposing wall which deviates from the first substantially linear wall.

41. The rocket motor of claim 40, further comprising a transmission line disposed within the at least one cavity and extending through the first and second openings.

42. The rocket motor of claim 41, wherein the transmission line is arranged within the at least one cavity such that it is displaced from both the first and second walls while the at least one body is in a state exhibiting substantially no strain.

43. The rocket motor of claim 42, wherein the first and second openings are sized and configured to frictionally grasp the transmission line.

44. A strain control device comprising:
   a substantially rigid body extending between a first end and a second end thereof, the body having a first grasping member configured to frictionally engage a first portion of a transmission line and a second grasping member configured to frictionally engage a second portion of the transmission line; and
   at least one cavity defined in the body between the first grasping member and the second grasping member, the at least one cavity being configured to accommodate a third portion of the transmission line therein and defining a deviation path for the third portion of the transmission line, wherein the at least one cavity is at least partially defined by the first boundary and a second opposing boundary, and wherein the first boundary is a substantially linear wall and the second opposing boundary is a second opposing wall which deviates from the first substantially linear wall.

45. A strain control device comprising:
   a substantially rigid body extending longitudinally between a first end and a second end thereof, the body having a plurality of body sections arranged in a longitudinally extending pattern, each body section including:
      at least one cavity formed therein, the at least one cavity having a periphery defined at least partially by a first wall and a second opposing wall which deviates laterally from the first wall; and
      at least one grasping member configured to receive and frictionally grasp a transmission line to be installed therein.

46. A strain control device comprising:
   a substantially rigid body extending longitudinally a first end and a second end thereof, the body having a first plurality of cavities arranged in a longitudinally extending pattern, each cavity being at least partially defined by a first wall and a second wall which laterally deviates from the first wall; and
   a first plurality of grasping members, wherein at least one grasping member of the first plurality is disposed between each of two adjacent cavities of the first plurality of cavities.

47. The strain control device of claim 46, further comprising
   at least a second plurality of cavities arranged in a longitudinally extending pattern and a second plurality of grasping members, wherein at least one grasping member of the second plurality of grasping members is disposed between each of two adjacent cavities of the second plurality of cavities.

48. A strain control device comprising:
   a substantially rigid body extending longitudinally between a first end and a second end thereof; and
   at least one cavity formed within a surface of the body between the first end and the second end, the at least one cavity configured to receive at least a portion of a transmission line therein and wherein the at least one cavity defines a deviation path for the at least a portion of the transmission line wherein the at least one cavity is at least partially defined by a first substantially linear boundary and a second opposing boundary which deviates from the first substantially linear boundary.

49. A strain control device comprising:
   a substantially rigid body extending longitudinally between a first end and a second end thereof, the body having a first grasping member configured to frictionally engage a first portion of a transmission line and a second grasping member configured to frictionally engage a second portion of the transmission line; and
   at least one cavity defined in the body between the first grasping member and the second grasping member, the at least one cavity being configured to accommodate a third portion of the transmission line therein and defining a deviation path for the third portion of the transmission line wherein the at least one cavity is at least partially defined by a first substantially linear wall and a second opposing wall which deviates from the first substantially linear wall.

* * * * *

UNITED STATES PATENT AND TRADEMARK OFFICE
CERTIFICATE OF CORRECTION

PATENT NO. : 6,770,821 B2
DATED : August 3, 2004
INVENTOR(S) : Thomas W. Higgs

It is certified that error appears in the above-identified patent and that said Letters Patent is hereby corrected as shown below:

<u>Title page</u>,
Item [57], ABSTRACT,
Line 10, change "wall" to -- wall, --

<u>Column 1</u>,
Line 15, change "wires" to -- wires, --
Line 66, change "cross section" to -- cross-section --

<u>Column 2</u>,
Line 23, delete "casing"
Line 28, change "covers 112" to -- covers 112, --
Line 29, change "therethrough" to -- therethrough, --
Line 46, insert -- as -- after "considered"

<u>Column 4</u>,
Line 2, insert -- at least one -- between "the" and "cavity"
Line 8, change "an first" to -- a first --
Lines 42 and 54, change "cross sectional" to -- cross-sectional --

<u>Column 5</u>,
Line 21, change "cavity 214" to -- cavity 214, --
Line 22, change "opening 206" to -- opening 206, --
Line 23, insert -- first -- before "cavity"
Line 27, change ""C-shaped"" to -- "C-shaped," --
Line 36, change "ring like" to -- ring-like --
Line 60, change "cross sectional" to -- cross-sectional --

<u>Column 6</u>,
Line 11, insert comma after "FIG. 5"
Line 35, insert comma after "body 202"
Line 45, insert comma after "points"

<u>Column 7</u>,
Line 56, change "FIG. 2," to -- FIG. 3, --

<u>Column 8</u>,
Line 41, insert comma after "another"

UNITED STATES PATENT AND TRADEMARK OFFICE
CERTIFICATE OF CORRECTION

PATENT NO. : 6,770,821 B2
DATED : August 3, 2004
INVENTOR(S) : Thomas W. Higgs

It is certified that error appears in the above-identified patent and that said Letters Patent is hereby corrected as shown below:

Column 9,
Line 5, insert -- first -- befor "plurality"

Column 10,
Line 8, change "end to end" to -- end-to-end --
Line 54, change "destruct charge." to -- destruct charge 104A. --

Column 11,
Line 20, change "cross section" to -- cross-section --

Column 13,
Line 19, change "28" to -- 37 --

Column 14,
Lines 29-30, remove break in spacing

Signed and Sealed this

Twenty-second Day of February, 2005

JON W. DUDAS
*Director of the United States Patent and Trademark Office*